Dec. 7, 1948.  V. R. DESPARD  2,455,889
QUICK ATTACH STRAP
Filed Sept. 28, 1945
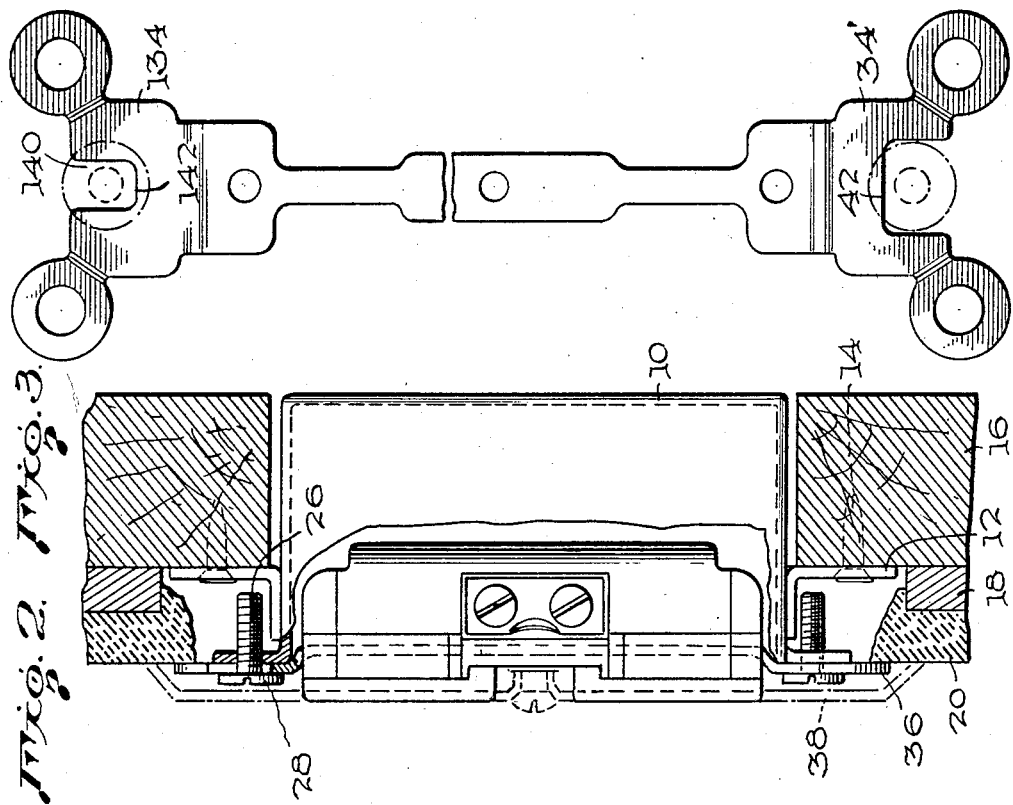
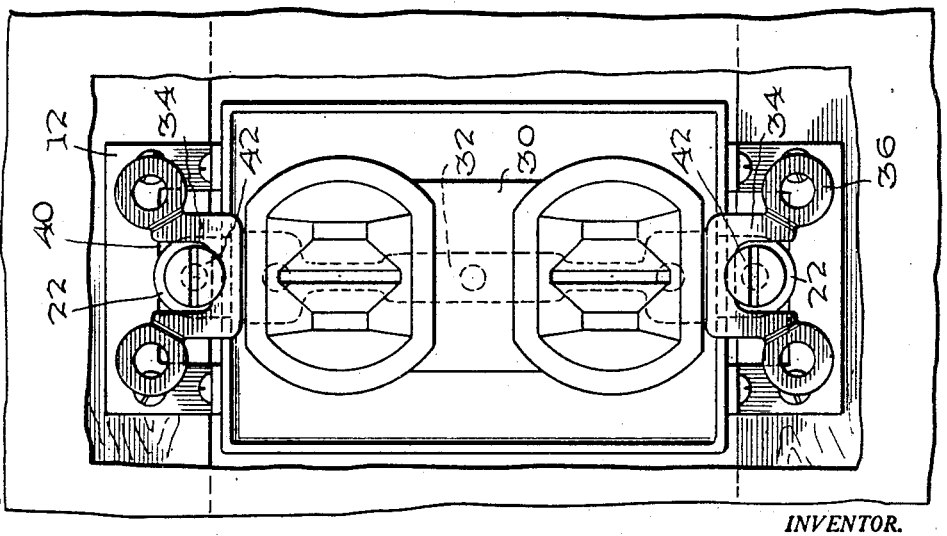
*INVENTOR.*
VICTOR R. DESPARD
BY
*Leech r Radue*
ATTORNEYS Patented Dec. 7, 1948

2,455,889

UNITED STATES PATENT OFFICE 2,455,889

QUICK ATTACH STRAP

Victor R. Despard, Syracuse, N. Y., assignor to Pass & Seymour, Inc., Syracuse, N. Y., a corporation of New York Application September 28, 1945, Serial No. 619,229

5 Claims. (Cl. 174—52)

This invention relates to electric wiring devices, and more particularly to mounting means for such wiring devices adapted for installation in flush installed outlet or wall boxes.

It is a general object of the present invention to provide a novel and improved wiring device mounting means.

Among the specific objects of the invention may be particularly mentioned the provision of a mounting means or strap constructed to be engaged over pre-inserted screws arranged in the mounting ears on the outlet box.

A prominent feature of the invention comprises mounting means or strap mechanism for holding wiring devices in boxes in which the ends of the means are bifurcated or forked, with the spacing between the inner or bottom ends of the notches forming the forks less than the spacing between the shanks of the mounting screws.

Another important feature comprises forming at least one of the notches of a width greater than the diameter of the mounting screw head whereby this screw overlaps only the bottom or inner edge of the notch, permitting lateral adjustment for device alignment in the box.

Other objects and features of the invention, including convenience in mounting, ease of construction and general facility in use, will be more apparent to those skilled in the art upon a consideration of the accompanying drawing and following specification, wherein are disclosed two exemplary embodiments of the invention, with the understanding that such modifications may be made therein as fall within the scope of the appended claims without departing from the spirit of the invention.

In said drawing:

Fig. 1 is an elevation of a wiring device equipped with the mounting means of the present invention, shown positioned in a flush mounted conduit box, the cover or wall plate being omitted for clearness;

Fig. 2 is a side elevation of the assembly of Fig. 1 with portions of the side wall of the box broken away and with one of the mounting ends in longitudinal central section; and Fig. 3 is a view on an enlarged scale of a one piece mounting strap embodying slight modifications in the notching arrangement.

In the construction of houses, office buildings, public buildings and the like, where plastered or similar wall finishes are used, the customary procedure in wiring the building for electrical outlets, switches and similar devices, includes the installation of rigid or flexible conduit and wires with wall or conduit boxes installed where desired to receive the several wiring devices. These boxes are mounted prior to the application of the plaster and are attached to structural members, lathing or the like. The wireman attempts to judge the thickness of the plaster to be applied and mounts the box in a position which he hopes will place its forward face at the level of the surface of the plaster. The boxes are roughly mounted and this ideal is seldom achieved.

Each box is provided with two oppositely disposed mounting ears at the forward face, which are drilled or tapped to receive the mounting screws used for fastening the wiring device in the box. The wall plaster is applied after the boxes are mounted and the operation is one where great care is not used. As a consequence a certain amount of plaster is often introduced in the box and the holes for the mounting screws filled with plaster. Often the mounting ears are buried in the plaster if the box is mounted somewhat low.

When it becomes time to mount the wiring device, the wire ends which are tucked into the box are withdrawn, stripped and connected to the unmounted wiring device, which must then be pressed into the box with the ends of its mounting strip over the aforesaid ears. The difficulty of then inserting the mounting screws with the wiring device and the wireman's hand in the way in poorly lighted places will be readily appreciated. The trouble is amplified if the ears are covered with plaster or the screw holes filled.

In accordance with the present invention it is proposed to pre-insert the screws, having them initially run up with the heads against the box ears so as not to obstruct the work of the plasterer. The wireman withdraws these screws to almost their full extent and with the aid of the present invention merely slips the wiring device mounting strap over them and runs the screws back into position. Means is provided to facilitate slight lateral and longitudinal adjustment of the wiring device in the box to permit plumb mounting of the device in spite of slight inequalities in the mounting of the box.

Referring now to Figs. 1 and 2 of the drawing, the conventional single gang box 10 is clearly illustrated as mounted by means of conventional brackets 12 and screws 14 onto blocks or other structural members 16 in the wall. The laths are shown at 18 and plaster at 20. Each box has at each end a mounting ear 22 bent outwardly from the metal thereof and having its front face flush with the forward edges of the box walls. These ears are tapped as at 24 to receive the threaded shanks 26 of suitable mounting screws having flat fillister heads 28. Any of the well known forms of wiring devices, such as the double convenience outlet shown at 30, may be mounted by the device of this invention. These may include single or double convenience outlets, single or multiple switches, pilot lights and prearranged or interchangeable combinations of these devices as in the so-called "Despard" line.

The mounting strap 32 is suitably formed between its end tab 34 to accommodate the particular unit to which it is attached or in which it is moulded. In some cases the central portion may be omitted and separate end tabs only secured to the wiring device.

It is these end tabs which comprise the essential features of the invention. As shown in Fig. 1, and except for the plaster-ears 36, these devices are substantially rectangular in form and spaced to overlie and overlap the box ears 22. The portions 36 may conveniently rest on the surface of the plaster, as seen in Fig. 2, to insure proper positioning of the device in respect to the wall surface so that the cover plate, shown at 38 in dotted lines in Fig. 2, may properly cover most of and yet expose the desired portions of the wiring device.

Each of the mounting tabs 34 is slotted or notched in its outer end along the axis of the wiring assembly, and as shown in Fig. 1 the notches 40 are substantially rectangular with the side walls spaced apart from $\frac{3}{32}$ to $\frac{1}{16}$ of an inch wider than the heads 28 of the screws whereby they will pass over these heads. The spacing between the bottom walls 42 of the two notches, however, is sufficiently less than the distance between the closest approach of the shanks of the two screws to permit mounting in a manner to be subsequently described, while still insuring adequate cooperation of the screw heads with the metal of the tabs adjacent these bottom walls for securing the tabs to the mounting ears. Lateral adjustment to align the wiring device with the vertical or horizontal, in case of inequalities in box mounting, is available in adequate amounts because of the much greater width of the notches or slots than the diameter of the screw shanks.

In order to mount a device equipped with tabs of the present invention, the pre-inserted screws are partially withdrawn, one preferably to near the maximum extent permitted by its length. The device is slightly tilted so that one edge 42 can be passed under the head of the least withdrawn screw until it abuts the shank thereof close against the mounting tab. The other edge 42 will now clear the inner edge of the head of the opposite screw which is positioned considerably above the mounting ear.

Upon this latter end being brought against its ear the two screws may be drawn down while the wiring device is held in its desired position properly aligned. The screws will then clamp at least the metal of the tabs adjacent the bottom edges 42 and may even overlap at least one wall of each slot after some rotary adjustment has been effected. This type of mounting is entirely safe because even if the screws should be slightly loosened the tabs cannot become disengaged, since the amount of overlap of each screw head on the wall adjacent the bottom of the respective notch is more than the distance from the corresponding wall of the opposite notch to its screw shank.

In the embodiment shown in Fig. 3 the strap and its tabs only is illustrated. The tab 34' is constructed identical with the tabs of the embodiment of Figs. 1 and 2, but the tab 134 at the opposite end is equipped with a different notch 140. The bottom walls 42 and 142 of these notches are spaced the same distance apart as in the first embodiment while the width of the notch 140 is considerably less than the diameter of the screw head but about $\frac{1}{32}$ of an inch greater in width than the diameter of the screw shank.

With this construction the narrow notch is first mounted under the least withdrawn screw and the wide notch is passed over the head of the other one as in the first construction. Substantially the same longitudinal adjustment is provided with this arrangement, in case it is required to insure the cover plate hiding inequalities in the plaster about the box. The end of the narrow slot permits about $\frac{1}{32}$ of an inch lateral adjustment, while the opposite end permits as much as $\frac{3}{32}$ of an inch, giving a total leeway of approximately $\frac{1}{8}$ of an inch for alignment.

In either form there is no possibility of the wiring device tabs becoming disengaged from the screws in spite of manufacturing tolerances of $\frac{1}{16}$ of an inch in the screw spacing in the box ears.

I claim:

1. A quick attach means for mounting a wiring device within an outlet box having spaced ears each receiving a pre-inserted headed screw, comprising a tab extending from each end of said wiring device, each of said tabs having its outer end provided with a slot, the bottom walls of the two slots being spaced apart a distance less than that between the shanks of the said screws but greater than that between the heads thereof, at least one of said slots being wide enough for its full length to pass over the head of one of said screws.

2. The combination with an electric wiring device to be secured in an outlet box, of supporting means for said device attached thereto and having two oppositely disposed projecting tabs to be attached to the box each by means of a screw extending through the same and into a tapped hole in the box, each of said tabs having a notch therein, said notches opening oppositely and having their bottom walls spaced a distance intermediate that between the shanks of the two screws and that between the heads thereof, at least one of the notches being wide enough for its full length to pass over the head of one of said screws whereby the wiring device may be mounted by means of pre-inserted screws.

3. A quick attach means for mounting a wiring device within an outlet box having spaced ears each receiving a pre-inserted headed screw, comprising a tab extending from each end of said wiring device, each of said tabs having its outer end slotted, the bottom walls of the two slots being spaced apart a distance less than that between the shanks of the said screws but greater than that between the head thereof, each of said slots being wide enough throughout its length to pass over the head of one of said screws.

4. A quick attach means for mounting a wiring device within an outlet box having ears each receiving a pre-inserted headed screw, comprising a tab extending from each end of said wiring device, each of said tabs having its outer end slotted, the bottom walls of the two slots being spaced apart a distance less than that between the shanks of the said screws but greater than that between the heads thereof, one of said slots being wide enough throughout its length to pass over the head of one of said screws and the other being of a width intermediate the diameter of the shank and head of one of said screws.

5. The combination with an electric wiring device and an outlet box, of supporting means for said device attached thereto and having projecting tabs attached to the box by means of screws extending through the same and into tapped holes in the box, each of said tabs having a notch therein through which the shank of one of said screws passes, said two notches being oppositely disposed and having their adjacent walls spaced apart a distance intermediate that between the screw shanks and that between the closest edges of the screw heads, at least one of said notches being sufficiently wide to pass freely over the head of one of said screws.

VICTOR R. DESPARD.

REFERENCES CITED

The following references are of record in the file of this patent:

UNITED STATES PATENTS

| Number | Name | Date |
|---|---|---|
| 755,393 | Russell | Mar. 22, 1904 |
| 1,562,612 | Benjamin | Nov. 24, 1925 |
| 1,839,945 | Boyton | Jan. 5, 1932 |